(12) United States Patent
Moffat et al.

(10) Patent No.: US 12,379,677 B2
(45) Date of Patent: *Aug. 5, 2025

(54) LATEXES AND RELATED COMPOSITIONS

(71) Applicant: Xerox Corporation, Norwalk, CT (US)

(72) Inventors: Karen A. Moffat, Brantford (CA); Sepehr M. Tehrani, North York (CA); Kimberly D. Nosella, Ancaster (CA); Richard P. N. Veregin, Mississauga (CA)

(73) Assignee: XEROX CORPORATION, Norwalk, CT (US)

( * ) Notice: Subject to any disclaimer, the term of this patent is extended or adjusted under 35 U.S.C. 154(b) by 1044 days.

This patent is subject to a terminal disclaimer.

(21) Appl. No.: 17/386,064

(22) Filed: Jul. 27, 2021

(65) Prior Publication Data
US 2023/0100354 A1 Mar. 30, 2023

(51) Int. Cl.
C08F 212/08 (2006.01)
C08F 20/18 (2006.01)
C08F 20/28 (2006.01)
C09D 125/14 (2006.01)
G03G 9/087 (2006.01)
C09D 133/14 (2006.01)

(52) U.S. Cl.
CPC ........ G03G 9/08711 (2013.01); C08F 212/08 (2013.01); C08F 20/18 (2013.01); C08F 20/28 (2013.01); C09D 125/14 (2013.01); C09D 133/14 (2013.01); G03G 9/0874 (2013.01)

(58) Field of Classification Search
CPC ............. G03G 9/08711; G03G 9/0874; C09D 125/14; C09D 133/14; C08F 20/18; C08F 20/28
See application file for complete search history.

(56) References Cited

U.S. PATENT DOCUMENTS

| | | | |
|---|---|---|---|
| 2,680,735 A * | 6/1954 | Fegley | C07D 317/24 |
| | | | 526/75 |
| 4,923,919 A | 5/1990 | Frazee | |
| 5,461,103 A | 10/1995 | Bafford et al. | |
| 5,468,800 A | 11/1995 | Folsch et al. | |
| 6,020,416 A | 2/2000 | Mazur et al. | |
| 6,841,329 B2 | 1/2005 | Nguyen et al. | |
| 7,413,842 B2 | 8/2008 | Vanbesien et al. | |
| 8,728,455 B2 | 5/2014 | Konradi et al. | |
| 8,952,081 B2 | 2/2015 | Annis et al. | |
| 9,090,736 B2 | 7/2015 | Schwalm et al. | |
| 9,371,464 B2 | 6/2016 | Breton et al. | |
| 9,862,788 B2 | 1/2018 | Hilf et al. | |
| 11,834,580 B2 * | 12/2023 | Tehrani | C09D 11/033 |
| 11,952,451 B2 * | 4/2024 | Tehrani | C09D 11/107 |
| 2003/0029355 A1 | 2/2003 | Miyabayashi | |
| 2006/0038867 A1 | 2/2006 | Valentini | |
| 2007/0099814 A1 | 5/2007 | Tamori et al. | |
| 2008/0186373 A1 | 8/2008 | Rolly | |
| 2009/0191419 A1 * | 7/2009 | Yukawa | C09D 5/024 |
| | | | 428/522 |
| 2010/0029840 A1 * | 2/2010 | Morimoto | C09D 133/06 |
| | | | 524/543 |
| 2011/0312240 A1 | 12/2011 | Amthor et al. | |
| 2011/0318551 A1 | 12/2011 | Nakagawa | |
| 2012/0083021 A1 | 4/2012 | Bohling et al. | |
| 2013/0289171 A1 | 10/2013 | Miller et al. | |
| 2016/0090495 A1 | 3/2016 | Suzuki | |
| 2016/0122597 A1 | 5/2016 | Xiao et al. | |
| 2018/0273778 A1 | 9/2018 | Saito et al. | |
| 2019/0031638 A1 | 1/2019 | Beyer et al. | |
| 2019/0367753 A1 | 12/2019 | Chopra et al. | |
| 2022/0363920 A1 | 11/2022 | Veregin et al. | |
| 2023/0046647 A1 | 2/2023 | Moffat et al. | |
| 2023/0051056 A1 | 2/2023 | Moffat et al. | |
| 2023/0053177 A1 | 2/2023 | Tehrani | |
| 2023/0055456 A1 | 2/2023 | Tehrani et al. | |
| 2023/0073050 A1 | 3/2023 | Duquenne et al. | |

FOREIGN PATENT DOCUMENTS

| | | |
|---|---|---|
| CN | 107446457 | 12/2017 |
| CN | 111087540 A | 5/2020 |
| EP | 0609756 A2 * | 10/1994 |
| EP | 1921509 A1 | 5/2002 |
| EP | 1609827 A1 | 12/2005 |
| EP | 1108758 B1 | 7/2006 |
| EP | 2308934 A2 | 4/2011 |
| EP | 2546313 | 1/2013 |

(Continued)

OTHER PUBLICATIONS

Evonik launches Visiomer® Glyfoma, a low-odor reactive diluent—Evonik PDF press release, available from web as of Jul. 13, 2021 at https://methyl-methacrylate-monomers.evonik.com/en/evonik-launches-visiomer-glyfoma-a-low-odor-reactive-diluent-96754.html.

Hellgren et al., "Surfactants in water-borne paints," *Progress in Organic Coatings*, 35 (1999) 79-87.

Mckenzie, Andrew, et al. "Core (polystyrene)-Shell [poly (glycerol monomethacrylate)] particles." ACS Applied Materials & Interfaces 9.8 (2017): 7577-7590.

(Continued)

*Primary Examiner* — Kregg T Brooks
*Assistant Examiner* — David R. Foss
(74) *Attorney, Agent, or Firm* — Bell & Manning, LLC

(57) ABSTRACT

Latexes are provided which may comprise water and resin particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

4 Claims, No Drawings

(56) References Cited

FOREIGN PATENT DOCUMENTS

| | | |
|---|---|---|
| EP | 2762502 A1 | 8/2014 |
| EP | 2913186 A1 | 9/2015 |
| EP | 2823002 B1 | 5/2016 |
| EP | 1756237 B1 | 5/2017 |
| EP | 3360907 | 8/2018 |
| EP | 3494954 | 6/2019 |
| EP | 3494182 B1 | 4/2020 |
| JP | H0762035 A | 3/1995 |
| JP | H0772660 A | 3/1995 |
| JP | 2018/039936 A | 3/2018 |
| WO | WO2014/042653 | 3/2014 |
| WO | WO2015091318 | 6/2015 |
| WO | WO 2015/158649 | 10/2015 |
| WO | WO 2013/189746 A1 | 12/2016 |
| WO | WO 2017/134002 | 8/2017 |
| WO | WO2018/065558 | 4/2018 |
| WO | WO2018/087287 A1 | 5/2018 |
| WO | WO2018/143957 | 8/2018 |
| WO | WO2018/143959 | 8/2018 |
| WO | WO2018/143962 | 8/2018 |
| WO | WO2018/158436 A1 | 9/2018 |
| WO | WO-2020170272 A1 * | 8/2020 ............ C08F 257/02 |
| WO | WO 2020/194136 | 10/2020 |
| WO | WO 2021/099943 | 5/2021 |

OTHER PUBLICATIONS

Extended European Search Report for EP 22184492 dated Dec. 5, 2022; pp. 1-14.

International Agency for Research on Cancer "N-methylolacrylamide" IARC Monographs on the Evaluation of Carcinogenic Risks to Humans, No. 60 (Year: 1994).

* cited by examiner

LATEXES AND RELATED COMPOSITIONS

BACKGROUND

Many styrene-acrylate-based resins have been developed and used to provide a variety of toners, generally via emulsion aggregation processes, encompassing a broad range of desirable properties. However, emission of volatile organic compounds (VOCs) can be an issue when using such toners in multi-function printers under certain conditions, e.g., in confined spaces with limited air circulation or running at high print speeds over extended periods of time. To address this issue, residual monomer levels have been kept low, processes for making the resins and toners have been improved, and carbon filters have been added to printers.

SUMMARY

The present disclosure provides latexes comprising resin particles polymerized from dioxane/dioxolane monomers. The latexes may be used to form a variety of compositions, including toners and paints, which are also encompassed by the present disclosure. At least embodiments of the dioxane/dioxolane-based resin particles provide toners exhibiting reduced VOC emission while maintaining excellent printing performance.

In one aspect, latexes are provided. In embodiments, a latex comprises water and resin particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

In another aspect, paints are provided. In embodiments, a paint comprises water, a colorant, and resin particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both.

Other principal features and advantages of the disclosure will become apparent to those skilled in the art upon review of the following detailed description and the appended claims.

DETAILED DESCRIPTION

Latex

In one aspect, latexes are provided. Such a latex comprises resin particles synthesized from various monomers, forming a polymeric material from which the resin particles are composed. At least one type of monomer is used which is an ester of (meth)acrylic acid with an alcohol comprising a dioxane moiety or an alcohol comprising a dioxolane moiety. (The use of "(meth)" as in, e.g., "(meth)acrylic acid", refers to both acrylic acid and methacrylic acid.) In the present disclosure, this type of monomer may be referred to as an "dioxane/dioxolane monomer." This phrase, dioxane/dioxolane monomer, encompasses the monomer which is the ester of (meth)acrylic acid with the alcohol comprising the dioxane moiety, the monomer which is the ester of (meth)acrylic acid with the alcohol comprising the dioxolane moiety, and both such monomers. The dioxane moiety may be a 1,3-dioxane moiety and the dioxolane moiety may be a 1,3-dioxolane moiety. The alcohol comprising the dioxane/dioxolane moiety may be an acetal of a triol, a ketal of a triol, or a carbonate of a triol. Illustrative triols include glycerol and trimethylolpropane. The triol may be unsubstituted or substituted. By "substituted" it is meant that one or more bonds to a carbon(s) or hydrogen(s) are replaced by a bond to non-hydrogen and non-carbon atoms. The dioxane/dioxolane monomer may have Formula I (dioxane) or II (dioxolane) as shown below, wherein R is selected from hydrogen and methyl; R' is selected from hydrogen and ethyl; and Z is selected from hydrogen, an oxygen of a carbonyl group, an alkyl group, an aryl group, and an alkoxy group. Either or both types of monomers may be used in the resin particles.

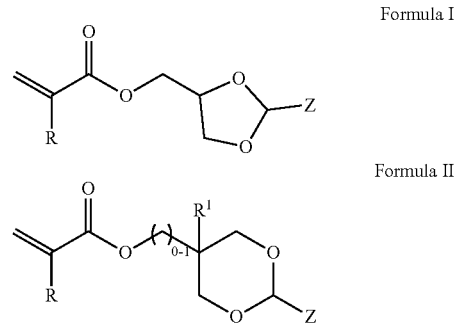

The carbonyl group refers to a C=O group, that is Z is O covalently bound to the carbon via a double bond, thereby forming a carbonyl group between the two oxygens of the 5 or 6-membered ring.

The alkyl group may be linear or branched. The alkyl group may have from 1 to 20 carbons. This includes having from 1 to 18 carbons and from 1 to 10 carbons, e.g., 1, 2, 3, 4, 5, 6, 7, 8, 9, or 10 carbons. The alkyl group may be substituted or unsubstituted. The aryl group may be monocyclic having one aromatic ring, e.g., benzene, or polycyclic having one or more fused rings. The aryl group may be unsubstituted or substituted as described above with respect to the alkyl group, although substituted aryl groups also encompass aryl groups in which a bond to a hydrogen(s) is replaced by a bond to an unsubstituted or substituted alkyl group as described above. The alkoxy group refers to an —O-alkyl group.

Illustrative dioxane/dioxolane monomers include glycerol formal (meth)acrylate, trimethylolpropane formal (meth)acrylate, and isopropylideneglycerol (meth)acrylate. A single type or combinations of different types of dioxane/dioxolane monomers may be used. In embodiments, however, the dioxane/dioxolane monomer is glycerol formal (meth)acrylate. In the present disclosure, the name "glycerol formal (meth)acrylate" (as well as the names of the other dioxane/dioxolane monomers described in this paragraph) refers to either the dioxane isomer, the dioxolane isomer, or both. That is, all possibilities are encompassed by the names.

At least one vinyl co-monomer is also used to form the resin particles. Illustrative vinyl co-monomers include the following: styrene, acrylate, methacrylate, butadiene, and isoprene. Illustrative vinyl co-monomers also include acidic and basic such monomers such as the following: acrylic acid, methacrylic acid, acrylamide, methacrylamide, quaternary ammonium halides of dialkyl or trialkyl acrylamides or methacrylamide, vinylpyridine, vinylpyrrolidone, vinyl-N-methylpyridinium chloride. Illustrative vinyl co-monomers also include those comprising a carboxylic acid group such as the following: acrylic acid, methacrylic acid, itaconic acid, beta-carboxyethyl acrylate (β-CEA), 2-carboxyethyl methacrylate, maleic acid, and cinnamic acid. A single type or combinations of different types of vinyl co-monomers may be used. In embodiments, at least two vinyl co-monomers are used comprising styrene and an alkyl (meth)acrylate (e.g., methyl (meth)acrylate, ethyl (meth)acrylate), butyl (meth)acrylate, or combinations thereof. Thus, the alkyl group of the alkyl (meth)acrylates may have 1 or more carbons, 2 or more carbons, 4 or more carbons, or from 1 to 6 carbons. In embodiments, at least three vinyl co-monomers are used comprising styrene, an alkyl (meth)acrylate, and a vinyl co-monomer comprising a carboxylic acid group. In embodiments, the alkyl (meth)acrylate is n-butyl acrylate. In embodiments, the third vinyl co-monomer is β-CEA.

A crosslinking agent may be used to form the resin particles. Illustrative crosslinking agents include decanediol diacrylate (ADOD), trimethylolpropane, pentaerythritol, trimellitic acid, pyromellitic acid, and combinations thereof. The crosslinking agent may also be referred to as a branching agent.

A chain transfer agent may be used to form the resin particles. The chain transfer agent may be a mercaptan or a thiol. Suitable chain transfer agents include n-dodecylmercaptan (NDM), n-dodecanethiol (DDT), tert-dodecylmercaptan, 1-butanethiol, 2-butanethiol, octanethiol, and combinations thereof. Halogenated carbons such as carbon tetrabromide, carbon tetrachloride, and combinations thereof may be used as chain transfer agents.

In embodiments, certain monomers may be excluded in forming the resin particles. Excluded monomers may include one or more of the following: vinyl-imidazolium monomers, urethane (meth)acrylate monomers, and silyl ester monomers such as (meth)acrylic acid triisoproylsilyl ester.

In forming the latex comprising the resin particles, various combinations of the monomers described above may be used in a monomer emulsion comprising a solvent, an initiator (which may be included in the monomer emulsion as stated here, or separately added in a distinct step(s) during the polymerization process), and optionally, one or more of the crosslinking agent, the chain transfer agent, and a surfactant. Water is generally used as the solvent, but water-soluble or water-miscible organic solvents (e.g., ethanol) may also be included.

The type of monomers used in the monomer emulsion and their relative amounts may be selected to tune the properties of the resin particles. This includes adjustment of the relative amount of the dioxane/dioxolane monomer and the vinyl co-monomer (including two or three such vinyl co-monomers) to achieve the $T_g$ values described below. Similarly, the presence, type, and amount of crosslinking agent and chain transfer agent may also be selected to tune the properties of the resin particles.

The dioxane/dioxolane monomer may be used in the monomer emulsion in an amount, e.g., in a range of from 1 weight % to 50 weight %, 5 weight % to 40 weight %, and 5 weight % to 30 weight %. (Here, weight % refers to the (total weight of dioxane/dioxolane monomers)/(total weight of monomers, crosslinking agents (if present), and chain transfer agents (if present) in the monomer emulsion)*100). The vinyl co-monomer may be used in the monomer emulsion in an amount, e.g., in a range of from 50 weight % to 98 weight %, from 60 weight % to 90 weight %, and from 65 weight % to 85 weight %. (Here, weight % refers to the (total weight of vinyl co-monomers)/(total weight of monomers, crosslinking agents (if present), and chain transfer agents (if present) in the monomer emulsion)*100). In embodiments in which more than one type of vinyl co-monomer is used, e.g., two or three, a first vinyl co-monomer (e.g., styrene) may make up, e.g., from 40 weight % to 95 weight % of the total weight of vinyl co-monomers; a second vinyl co-monomer (e.g., an alkyl (meth)acrylate) may make up, e.g., at least 15 weight %, at least 30 weight %, from 5 weight % to 60 weight % of the total weight of vinyl co-monomers; and a third vinyl co-monomer (e.g., β-CEA) may make up, e.g., up to 10 weight % of the total weight of vinyl co-monomers. Other ranges for the first vinyl co-monomer include, e.g., from 50 weight % to 80 weight % and from 50 weight % to 70 weight %; for the second vinyl co-monomer include, e.g., from 10 weight % to 50 weight %, and from 10 weight % to 30 weight %; and for the third vinyl co-monomer, e.g., from 0.1 weight % to 8 weight % and from 0.1 weight % to 5 weight %. Regarding an alkyl (meth)acrylate as a possible vinyl co-monomer, in embodiments, it is present at an amount of at least 15 weight % of the total weight of monomers, crosslinking agents (if present), and chain transfer agents (if present) in the monomer emulsion. This includes at least 20 weight % and at least 25 weight %.

The crosslinking agent, if used, may be present in the monomer emulsion at an amount, e.g., up to 20 weight %, from 0.01 weight % to 20 weight %, from 0.1 weight % to 5 weight %. (Here, weight % refers to the (total weight of crosslinking agents)/(total weight of monomers, crosslinking agents, and chain transfer agents (if present) in the monomer emulsion)*100).

The chain transfer agent if used, may be present in the monomer emulsion at an amount, e.g., up to 10 weight %, from 0.05 weight % to 10 weight %, from 0.25 weight % to 5 weight %. (Here, weight % refers to the (total weight of chain transfer agents)/(total weight of monomers, crosslinking agents (if present), and chain transfer agents in the monomer emulsion)*100).

The initiator initiates the polymerization reactions between the various monomers in the monomer emulsion. Examples of suitable initiators include water soluble initiators, such as ammonium persulfate (APS), sodium persulfate and potassium persulfate. Other water-soluble initiators which may be used include azoamidine compounds, for example 2,2'-azobis(2-methyl-N-phenylpropionamidine) dihydrochloride, 2,2'-azobis[N-(4-chlorophenyl)-2-methylpropionamidine]di-hydrochloride, 2,2'-azobis[N-(4-hydroxyphenyl)-2-methylpropionamidine]dihydrochloride, 2,2'-azobis[N-(4-amino-phenyl)-2-methylpropionamidine] tetrahydrochloride, 2,2'-azobis[2-methyl-N-(phenylmethyl) propionamidine]dihydrochloride, 2,2'-azobis[2-methyl-N-2-propenylpropionamidine]dihydrochloride, 2,2'-azobis[N-(2-hydroxy-ethyl)-2-methylpropionamidine]dihydrochloride, 2,2'-azobis[2(5-methyl-2-imidazolin-2-yl)propane]dihydrochloride, 2,2'-azobis[2-(2-imidazolin-2-yl)propane]dihydrochloride, 2,2'-azobis[2-(4,5,6,7-tetrahydro-1H-1,3-diazepin-2-yl)propane]dihydrochloride, 2,2'-azobis[2-(3,4,5,6-tetrahydropyrimidin-2-yl)propane]dihydrochlo-ride, 2,2'-azobis[2-(5-hydroxy-3,4,5,6-tetrahydropyrimidin-2-yl) propane]di-hydrochloride, 2,2'-azobis {2-[1-(2-hydroxyethyl)-2-imidazolin-2-yl]propane}dihydrochloride, and combinations thereof. Redox initiators may be used. As noted above, the initiator may be added separately, in distinct step(s) in the polymerization process. The initiator may be added as an initiator solution comprising the initiator and a solvent, e.g., water. Amounts of initiator used include those, e.g., in a range of from 0.1 weight % to 5 weight %. (Here, weight % refers to the (total weight of initiators)/(total weight of monomers in the monomer emulsion)*100.)

A surfactant may be used in the monomer emulsion which may be selected from anionic surfactants, cationic surfactants, nonionic surfactants, and combinations thereof. Amounts may be, e.g., up to 5 weight %, from 0.01 weight % to 5 weight %. ((Here, weight % refers to the (total weight of surfactants)/(total weight of monomers in the monomer emulsion)*100). Examples of anionic surfactants include sulfates and sulfonates, disulfonates, such as sodium dodecylsulfate (SDS), sodium dodecylbenzene sulfonate, sodium dodecylnaphthalene sulfate and the like; dialkyl benzenealkyl sulfates; acids, such as palmitic acid, and NEOGEN or NEOGEN SC available from Daiichi Kogyo Seiyaku, and the like. Other suitable anionic surfactants include DOWFAX™2 A1, an alkyldiphenyloxide disulfonate, available from The Dow Chemical Company and TAYCA POWER BN2060, a branched sodium dodecyl benzene sulfonate, available from Tayca Corporation (Japan).

Examples of cationic surfactants include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, trimethyl ammonium bromide, halide salts of quarternized polyoxyethylalkylamines, dodecylbenzyl triethyl ammonium chlorides, M1RAPOL® and ALKAQUAT® available from Alkaril Chemical Company, SANISOL® (benzalkonium chloride) available from Kao Chemicals, and the like.

Examples of nonionic surfactants include polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, and the like. Commercially available surfactants from Rhone-Poulenc such as IGEPAL CA-210™, IGEPAL CA520™, IGEPAL CA-720™, IGEPAL CO-890™, ANTAROX 890™, IGEPAL CO-720™, IGEPAL CO-290™, IGEPAL CA-210™ and ANTAROX897™ may be selected. Other examples of suitable nonionic surfactants include a block copolymer of polyethylene oxide and polypropylene oxide, including those commercially available as SYNPERONIC® PR/F and SYNPERONIC® PR/F 108.

The latex comprising the resin particles may be prepared using seeded emulsion polymerization. Such a technique may involve preparing a surfactant solution in a suitable reactor. In a separate vessel, a monomer emulsion may be prepared having any of the compositions described above, e.g., comprising a dioxane/dioxolane monomer, two or three vinyl co-monomers, a chain transfer agent, and a surfactant. An aliquot of the monomer emulsion (e.g., from 0.5% to 10% of the total amount of the monomer emulsion) may be added to the surfactant solution in the reactor. An initiator solution may be added to the reactor in order to allow seed particle formation. An additional amount of the monomer emulsion (e.g., the remaining amount) may be fed into the reactor to grow the seeds to a desired size. Reaction conditions, e.g., mixing, heating, etc., used during the steps are selected to facilitate polymerization and to provide resin particles having desired properties. Illustrative reaction conditions are described in the Examples below. Reaction conditions described in U.S. Pat. Nos. 6,841,329 and 7,413,842, each of which is hereby incorporated by reference in its entirety, may also be used.

The seeded emulsion polymerization technique described above provides the latex comprising the resin particles dispersed in the solvent. The latex may be used as is to form any of the toners described herein. However, further processing steps may be used, e.g., to recover the resin particles from the solvent. These processing steps include, e.g., filtration, drying, centrifugation, spray drying, freeze drying, etc.

The resin particles formed by the seeded emulsion polymerization technique described above may be characterized by their composition. As noted above, the polymeric material of the resin particles is the result of polymerization reactions between various combinations of monomers to form a polymerization product. For clarity, the composition of the polymeric material/resin particles may be identified by reference to the monomers which are polymerized, recognizing that the chemical form of those monomers is generally altered as a result of the polymerization reactions. The polymerization product, and thus, the resin particles, may comprise other components present in the emulsion described above. For example, initiators (or a portion thereof, e.g., a sulphate group) may become incorporated at the beginning and end of polymer chains. Similarly, crosslinking agents, if used, are generally incorporated into polymer chains. Surfactants, if used, may become entangled with polymer chains and become embedded within the resin particles, e.g., due to strong noncovalent binding or adsorption forces.

In embodiments, the resin particles comprise (or consist of) a polymerization product of reactants comprising a dioxane/dioxolane monomer, a vinyl co-monomer, an initiator, and optionally, a crosslinking agent. Any of the dioxane/dioxolane monomers, vinyl co-monomers, crosslinking agents, and initiators described herein may be used. In embodiments, the resin particles comprise (or consist of) a polymerization product of reactants comprising a dioxane/dioxolane monomer, two different vinyl co-monomers, an initiator, and optionally, a crosslinking agent. In embodiments, the resin particles comprise (or consist of) a polymerization product of reactants comprising a dioxane/dioxolane monomer, three different vinyl co-monomers, an initiator, and optionally, a crosslinking agent. In each of these embodiments, the monomers, crosslinking agent, initiator may be present in the resin particles in the amounts described above. (Experiments have shown that the conversion of the monomers is above 99.9%.) For example, the amount of the dioxane/dioxolane monomers may be in a range of from 1 weight % to 50 weight % in the resin particles. As above, this weight % refers to the (total weight of dioxane/dioxolane monomers)/(total weight of monomers, crosslinking agents (if present), and chain transfer agents (if present) in the resin particles)*100.

In any of the embodiments referenced in the paragraph above, one or more of the following variations may be used. Glycerol formal methacrylate may be used as the dioxane/dioxolane monomer. Styrene, an alkyl (meth)acrylate (e.g., n-butyl acrylate), a vinyl co-monomer comprising a carboxylic acid group (e.g., (β-CEA), and combinations thereof may be used as the vinyl co-monomer. Decanediol diacrylate may be used as the crosslinking agent.

Using a specific, illustrative composition, the composition of the resin particles may also be identified as poly[(styrene)-ran-(n-butyl acrylate)-ran-(glycerol formal (meth) acrylate)-ran-(β-CEA)], including a crosslinked version thereof. In this description, the different chemical moieties which result from the polymerization reactions is identified by reference to the corresponding monomer in its parenthesis and "ran" refers to the random incorporation of the different monomers into the copolymer. The use of this description encompasses the presence of an initiator (or portion thereof) at the beginning of each copolymer chain, as well as crosslinking via the crosslinking agents (if present).

In embodiments in which certain monomers are excluded from forming the resin particles, it follows that such monomers do not participate in the polymerization reactions to form the polymeric matrix of the resin particles. Thus, in these embodiments, the composition of the resin particles may be described as being free of (i.e., not comprising) one or more of vinyl-imidazolium monomers, urethane (meth) acrylate monomers, and silyl ester monomers such as (meth) acrylic acid triisoproylsilyl ester.

In embodiments, the latex may be described as being free of (i.e., not comprising) a resin/polymer other than what is provided by the resin of the present resin particles themselves. This includes being free of a polyurethane, a polyurethane (meth)acrylate, a poly(meth)acrylate (other than the resin particles themselves), a polyester, a silyl ester copolymer, a silyl (meth)acrylate polymer, or combinations thereof.

Since the resin/polymer making up the resin particles has already been polymerized, the latex itself is generally not curable and as such, is free of (i.e., does not comprise) an initiator. This does not preclude the presence of a minor amount of unreacted initiator or reacted initiator which may be incorporated into polymer chains. Similarly, the latex may be described as being free of (i.e., not comprising monomers).

In embodiments, the latex may also be described as being free of (i.e., not comprising) a fungicide/biocide such as medetomidine.

The water content of the latexes may be at least 50 weight %. This includes at least 60 weight % and at least 70 weight %. These weight % refer to the weight of water as compared to the total weight of the latex.

The resin particles may be characterized by their size. The size of the resin particles may be reported as a $D_{50}$ particle size, which refers to a diameter at which 50% of the sample (on a volume basis) is comprised of particles having a diameter less than said diameter value. In embodiments, the resin particles have a $D_{50}$ particle size in a range of from 100 nm to 400 nm. This includes, e.g., a range of from 100 nm to 300 nm, and from 200 nm to 350 nm. The $D_{50}$ particle size may be referenced to a value measured at a pH in a range of from 2 to 3. The $D_{50}$ particle size may be measured using a Nanotrac 252 instrument. This instrument uses a laser light-scattering technique, in which Doppler-shifted light generated from each particle in motion (Brownian motion) is measured. The signals generated by these shifts are proportional to the size of the particles. The signals are mathematically converted to particle size and size distribution. The analysis can be performed using an external probe or by inserting the probe into a fixed sample chamber. For light scattering techniques, NIST polystyrene Nanosphere control samples with a diameter within the range of 15 mm to 300 mm under the tradename NIST Traceable Reference Material for Nanotrac Particle Size Analyzers obtained from Microtrac may be used to calibrate the instrument.

The resin particles may be characterized by their onset glass transition temperature ($T_g$). The $T_g$ values may be measured as described in the Examples, below. In embodiments, the $T_g$ is in a range of from 40° C. to 90° C. This includes a range of from 45° C. to 85° C., and from 50° C. to 75° C.

The polymeric material (resin) of the resin particles may be characterized by its weight average molecular weight ($M_w$) and its number average molecular weight ($M_n$), measured as described in the Examples, below. The $M_w$ may be in a range of from 25,000 Daltons to 75,000 Daltons. This includes, e.g., from 30,000 Daltons to 70,000 Daltons and from 40,000 Daltons to 60,000 Daltons. The $M_n$ may be in a range of from 10,000 Daltons to 30,000 Daltons. This includes, e.g., from 15,000 Daltons to 25,000 Daltons and from 20,000 Daltons to 30,000 Daltons.

Toner

Any of the latexes described above may be utilized to form a toner comprising toner particles. The composition of the toner particles depends upon the composition of the resin particles of the latex(es) used. However, the toner may include other components, such as a wax, a colorant, and other additives. In making the toner, such waxes, colorants, and other additives may be utilized in dispersions comprising any of the solvents and surfactants described above.

Wax

A wax may be combined with the latex described above in forming the toner particles. A single type or a combination of different types of wax may be used. The wax may be present in various suitable amounts, for example, in a total amount of from about 3% to about 20% by weight of the toner particles, including from about 4% to about 20% by weight of the toner particles, and from about 5% to about 15% by weight of the toner particles.

Illustrative waxes include the following: an alkylene wax (such as an alkylene wax having from 1 to 25 carbon atoms), a polyethylene wax, a polypropylene wax, a paraffin wax, and a Fischer Tropsch wax (such as FNP-0092® available from Nippon Seiro comprising a Fischer-Tropsch wax containing 42 carbon atoms). Polypropylenes and polyethylenes commercially available from Allied Chemical and Petrolite Corporation may be used. Wax emulsions available from Michaelman Inc. and the Daniels Products Company may be used. Epolene N-15™ commercially available from Eastman Chemical Products, Inc.; Viscol 550P™, a low weight average molecular weight polypropylene available from Sanyo Kasei K. K.; and similar waxes may be used. The commercially available polyethylenes are believed to possess a molecular weight of about 1,000 to about 5,000, and the commercially available polypropylenes are believed to possess a molecular weight of about 4,000 to about 10,000. Examples of functionalized waxes which may be used include amines, amides, for example Aqua Superslip 6550™, Superslip 6530™ available from Micro Powder Inc., fluorinated waxes, for example Polyfluo 190™, Polyfluo 200™, Polyfluo S23XF™, Aqua Polyfluo 411™, Aqua Polysilk 19™, Polysilk 14™ available from Micro Powder Inc., mixed fluorinated, amide waxes, for example Microspersion 19™ also available from Micro Powder Inc., imides, esters, quaternary amines, carboxylic acids or acrylic polymer emulsion, for example Joncryl 74™, 89™, 130™, 537™, and 538™, all available from SC Johnson Wax, chlorinated polypropylenes and polyethylenes available from Allied Chemical and Petrolite Corporation and SC Johnson Wax. A single type or a combination of different types of wax may be used.

Colorants

A colorant may be combined with the latex described above in forming the toner particles. A single type or a combination of different types of colorants may be used.

Colorants include, for example, pigments, dyes, mixtures thereof, such as mixtures of dyes, mixtures of pigments, mixtures of dyes and pigments, and the like. The colorant may be added in amounts sufficient to impart the desired, color, hue, and shade. The colorant may be present in a total amount of, for example, from about 1% to about 25% by weight of the toner particles, including from about 1% to about 20% by weight of the toner particles, or from about 2% to about 15% by weight of the toner particles.

Carbon black, which is available in forms, such as furnace black, thermal black, and the like is a suitable colorant. Carbon black may be used with one or more other colorants, such as a cyan colorant, to produce a desired hue.

Examples of cyan pigments include copper tetra(octadecylsulfonamido) phthalocyanine, a copper phthalocyanine colorant listed in the Color Index (CI) as CI 74160, HELIOGEN BLUE L6900™, D6840™, D7080™, D7020™, PYLAM OIL BLUE™, PYLAM OIL YELLOW™ and PIGMENT BLUE I™ available from Paul Uhlich & Co., Inc., CI Pigment Blue (PB), PB 15:3, PB 15:4, an Anthrazine Blue colorant identified as CI 69810, Special Blue X-2137, mixtures thereof, and the like.

Examples of magenta pigments include a diazo dye identified as C.I. 26050, 2,9-dimethyl-substituted quinacridone, an anthraquinone dye identified as C.I. 60710, C.I. Dispersed Red 15, CINQUASIA MAGENTA™ available from E.I. DuPont de Nemours & Co., C.I. Solvent Red 19, Pigment Red (PR) 122, PR 269, PR 185, mixtures thereof, and the like.

Examples of yellow colorants include diarylide yellow 3,3-dichlorobenzidene acetoacetanilide, a monoazo pigment identified in the Color Index as C.I. 12700, C.I. Solvent Yellow 16, a nitrophenyl amine sulfonamide identified in the Color Index as Foron Yellow SE/GLN, LEMON CHROME YELLOW DCC 1026™ CI, NOVAPERM YELLOW FGL™ from sanofi, Paliogen Yellow 152, 1560 (BASF), Lithol Fast Yellow 0991K (BASF), Paliotol Yellow 1840 (BASF), Neopen Yellow (BASF), Novoperm Yellow FG 1 (sanofi), Permanent Yellow YE 0305 (Paul Uhlich), Pigment Yellow 74, Lumogen Yellow D0790 (BASF), Sunsperse Yellow YHD 6001 (Sun Chemicals), SUCD-Yellow D1355 (BASF), Permanent Yellow FGL, Disperse Yellow, 3,2,5-dimethoxy-4-sulfonanilide phenylazo-4'-chloro-2,5-dimethoxy acetoacetanilide, mixtures thereof, and the like.

Other colorants which may be used include the following: Paliogen Violet 5100 and 5890 (BASF), Normandy Magenta RD-2400 (Paul Ulrich), Permanent Violet VT2645 (Paul Ulrich), Heliogen Green L8730 (BASF), Argyle Green XP-111-S (Paul Ulrich), Brilliant Green Toner GR 0991 (Paul Ulrich), Lithol Scarlet D3700 (BASF), Toluidine Red (Aldrich), Scarlet for Thermoplast NSD Red (Aldrich), Lithol Rubine Toner (Paul Ulrich), Lithol Scarlet 4440, NBD 3700 (BASF), Bon Red C (Dominion Color), Royal Brilliant Red RD-8192 (Paul Ulrich), Oracet Pink RF (Ciba Geigy), Paliogen Red 3340 and 3871K (BASF), Lithol Fast Scarlet L4300 (BASF), Heliogen Blue D6840, D7080, K7090, K6910 and L7020 (BASF), Sudan Blue OS (BASF), Neopen Blue FF4012 (BASF), PV Fast Blue B2G01 (American Hoechst), Irgalite Blue BCA (Ciba Geigy), Paliogen Blue 6470 (BASF), Sudan II, III and IV (Matheson, Coleman, Bell), Sudan Orange (Aldrich), Sudan Orange 220 (BASF), Paliogen Orange 3040 (BASF), Ortho Orange OR 2673 (Paul Ulrich), Paliogen Yellow 152 and 1560 (BASF), Lithol Fast Yellow 0991K (BASF), Paliotol Yellow 1840 (BASF), Novaperm Yellow FGL (Hoechst), Permanerit Yellow YE 0305 (Paul Ulrich), Lumogen Yellow D0790 (BASF), Suco-Gelb 1250 (BASF), Suco-Yellow D1355 (BASF), Suco Fast Yellow D1165, D1355 and D1351 (BASF), Hostaperm Pink E (Hoechst), Fanal Pink D4830 (BASF), Cinquasia Magenta (DuPont), Paliogen Black L9984 9BASF), Pigment Black K801 (BASF) and particularly carbon blacks such as REGAL® 330 (Cabot), Carbon Black 5250 and 5750 (Columbian Chemicals).

Additional useful colorants include pigments in water based dispersions such as those commercially available from Sun Chemical, for example SUNSPERSE BHD 6011 (Blue 15 Type), SUNSPERSE BHD 9312 (Pigment Blue 15), SUNSPERSE BHD 6000 (Pigment Blue 15:3 74160), SUNSPERSE GHD 9600 and GHD 6004 (Pigment Green 7 74260), SUNSPERSE QHD 6040 (Pigment Red 122), SUNSPERSE RHD 9668 (Pigment Red 185), SUNSPERSE RHD 9365 and 9504 (Pigment Red 57, SUNSPERSE YHD 6005 (Pigment Yellow 83), FLEXIVERSE YFD 4249 (Pigment Yellow 17), SUNSPERSE YHD 6020 and 6045 (Pigment Yellow 74), SUNSPERSE YHD 600 and 9604 (Pigment Yellow 14), FLEXIVERSE LFD 4343 and LFD 9736 (Pigment Black 7). Other useful water based colorant dispersions include those commercially available from Clariant, for example, HOSTAFINE Yellow GR, HOSTAFINE Black T and Black TS, HOSTAFINE Blue B2G, HOSTAFINE Rubine F6B and magenta dry pigment such as Toner Magenta 6BVP2213 and Toner Magenta EO2 which can be dispersed in water and/or surfactant prior to use.

Other useful colorants include, for example, magnetites, such as Mobay magnetites MO8029, MO8960; Columbian magnetites, MAPICO BLACKS and surface treated magnetites; Pfizer magnetites CB4799, CB5300, CB5600, MCX6369; Bayer magnetites, BAYFERROX 8600, 8610; Northern Pigments magnetites, NP-604, NP-608; Magnox magnetites TMB-100 or TMB-104.

Toner Preparation

Various techniques may be used to form the toner particles of the toner, including emulsion-aggregation (EA) processes. In embodiments, an EA process comprises aggregating a mixture comprising a latex, a colorant, and optionally, a wax, and then coalescing the aggregated mixture. Any of the latexes described above may be used, including a single type of latex or combinations of different types of latexes, each comprising a different type of resin particles. The colorant and wax may be utilized as aqueous dispersions as described above. The mixture may be homogenized during the EA process, which may be accomplished by mixing at about 600 to about 6,000 revolutions per minute.

Aggregation may be achieved by adding any suitable aggregating agent (coagulant) to the mixture. The aggregating agent may be an inorganic cationic coagulant, such as, for example, a polyaluminum halide, such as polyaluminum chloride (PAC) or the corresponding bromide, fluoride or iodide; a polyaluminum silicate, such as, polyaluminum sulfosilicate (PASS); or a water soluble metal salt, including, aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate or mixtures thereof. The aggregating agent may be added to the mixture at a temperature that is below the $T_g$ of the resin particles of the latex. The aggregating agent may be added to the mixture in any suitable amount, e.g., in a range of from 0.05% to 5% weight of the toner particles. The aggregating agent may be added in a solution of nitric acid or a similar acid. To control aggregation of the particles, the aggregating agent may be metered into the mixture over time, e.g., over a period of from about 5 min to about 240 min. The addition of the aggregating agent may be accomplished with continued homogenization. The mixture may be further homogenized after addition.

The particles may be permitted to aggregate until a predetermined desired particle size is obtained. A predetermined desired size refers to the desired particle size to be obtained as determined prior to formation, and the particle size may be monitored during the growth process. Samples may be taken during the growth process and analyzed, for example, with a Nanotrac™ 252, for $D_{50}$ particle size. The aggregation may proceed by maintaining the mixture at an elevated temperature, or slowly raising the temperature to, e.g., from about 40° C. to about 100° C., and holding the mixture at this temperature for a period of time, e.g., from about 0.5 hours to about 10 hours, while maintaining stirring or homogenization, to provide the aggregated particles. Once the predetermined desired particle size is reached, the growth process is halted. The $D_{50}$ particles size of the particles may be, for example, from about 3 μm to about 10 μm, from about 3 μm to about 8 μm, or from about 3 μm to about 6 μm.

Shell Resin

In embodiments, after aggregation, but prior to coalescence, a resin coating may be applied to the aggregated particles (core) to form a shell thereover. The shell is applied by using any of the latexes described above. The shell latex may be different from the core latex, but this isn't required. The resin particles of the shell latex and the resin particles of the core latex may differ from one another, e.g., by having different onset glass transition temperature $T_g$ values, different $M_w/M_n$ molecular weights, being crosslinked or being uncrosslinked, and combinations thereof.

Once the desired final size of the toner particles is achieved, the pH of the mixture may be adjusted with a pH control agent to a value of, e.g., from about 3 to about 10. Suitable pH control agents include various bases including alkali metal hydroxides such as, for example, sodium hydroxide, potassium hydroxide, ammonium hydroxide, combinations thereof, and the like. A chelating agent (sequestering agent) may also be added. Various suitable chelating agents may be used, such as ethylenediaminetetraacetic acid (EDTA), salts of EDTA, tartaric acid, gluconal, hydroxyl-2,2'iminodisuccinic acid (HIDS), dicarboxylmethyl glutamic acid (GLDA), methyl glycidyl diacetic acid (MGDA), hydroxydiethyliminodiacetic acid (HIDA), sodium gluconate, potassium citrate, sodium citrate, nitrotriacetate salt, humic acid, fulvic acid; alkali metal salts of EDTA, gluconic acid, oxalic acid, polyacrylates, sugar acrylates, citric acid, polyaspartic acid, diethylenetriamine pentaacetate, 3-hydroxy-4-pyridinone, dopamine, eucalyptus, iminodisuccinic acid, ethylenediaminedisuccinate, polysaccharide, sodium ethylenedinitrilotetraacetate, thiamine pyrophosphate, farnesyl pyrophosphate, 2-aminoethylpyrophosphate, hydroxyl ethylidene-1,1-diphosphonic acid, aminotrimethylenephosphonic acid, diethylene triaminepentamethylene phosphonic acid, ethylenediamine tetramethylene phosphonic acid, mixtures thereof, and the like. Various suitable amounts of the chelating agent may be used, e.g., in an amount of from about 0.1% to about 1% by weight of the toner particles, from about 0.2% to about 0.7% by weight of the toner particles, or from about 0.3% to about 0.5% by weight of the toner particles.

Coalescence

Following aggregation and application of the shell (if desired), the particles may then be coalesced to the desired final shape, the coalescence being achieved, by, heating the mixture to a temperature, e.g., of from about 80° C. to about 110° C., which may be at or above the $T_g$ of the resin(s) utilized to form the toner particles. The particular selection of temperature is a function of the resins used. The mixture may be stirred, e.g., at from about 100 rpm to about 1,000 rpm. Coalescence may be accomplished over a period of time, e.g., of from about 1 minute to about 10 hours. The particles may be coalesced until a desired circularity is achieved. During coalescence, pH control agents including various acids such as nitric acid may be used to adjust the pH, for example, to a value of from about 3 to about 10.

After coalescence, the mixture may be cooled to room temperature, such as from about 20° C. to about 25° C. The cooling may be rapid or slow as desired. During cooling, pH control agents may be used to adjust the pH, e.g., to a value of from about 3 to about 10. After cooling, the toner particles optionally may be washed with water and then dried. Drying may be accomplished by any suitable method including, for example, freeze-drying.

Toner particles comprising a single type of resin or more than one type of resin are encompassed. Toner particles comprising more than one type of resin may contain various relative amounts of the different types of resins. In embodiments, two different types of resins are used, a first resin being present at an amount of, e.g., from 25% to 99% by weight of the toner particles, and the second resin being present at an amount of, e.g., up to 35% by weight of the toner particles. This includes the first resin being present at an amount of from 30% to 80% by weight and from 40% to 70% by weight and the second resin being present at an amount of from 10% to 50% by weight and from 15% to 40% by weight. In embodiments, the first resin forms the core of the toner particles while the second resin forms the shell of the toner particles.

The toner particles may contain various total amounts of resin, e.g., in an amount of from about 60% to about 95% by weight of the toner particles, from about 65% to about 90% by weight of the toner particles, or from about 75% to about 85% by weight of the toner particles.

The composition of the toner particles depends upon the resin(s) used. Thus, the composition of the toner particles follows that described above for the various resin particles.

Variations of the illustrative toner preparation processes described above may be applied, including those described in U.S. Pat. Nos. 6,841,329 and 7,413,842, each of which is hereby incorporated by reference in its entirety, may also be used.

Additives

The toner may further contain a variety of additives to enhance the properties of the toner. The toner may include charge additives in amounts of, e.g., from about 0.1% to about 10% by weight of the toner. Suitable charge additives include alkyl pyridinium halides, bisulfates, the charge control additives of U.S. Pat. Nos. 3,944,493; 4,007,293; 4,079,014; 4,394,430 and 4,560,635, the entire disclosures of each of which are hereby incorporated by reference in their entirety, negative charge enhancing additives like aluminum complexes, any other charge additives, mixtures thereof, and the like.

The toner may contain surface additives. Surface additives that can be added to the toner particles after washing or drying include, for example, metal salts, metal salts of fatty acids, colloidal silicas, metal oxides, strontium titanates, mixtures thereof, and the like, which each may be present in an amount of from about 0.1% to about 10% by weight of the toner. Examples of such additives include, for example, those disclosed in U.S. Pat. Nos. 3,590,000, 3,720, 617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be selected in amounts, for example, of from about 0.05% to about 5% by weight of the toner, which additives can be added during the aggregation process or blended into the formed toner particles.

In the present disclosure, the phrases "toner" and "toner composition" refer to those compositions which are configured for use in xerographic printers to form images therewith. Thus, in addition to the resins, colorants, present organic additives, and optional wax and other, the toner may include any other component generally used in such compositions in order to form an object using the desired xerographic printer.

The present toners may be described as being free of (i.e., not comprising) a resin other than those provided by the resin of the present resin particles. This includes being free of a polyurethane, a poly(meth)acrylate (other than the resin particles themselves), a polyester or combinations thereof. A single type of resin may be used. Similarly, the toner composition itself is generally not curable and as such, is free of (i.e., does not comprise) an initiator. This does not preclude the presence of a minor amount of unused initiator from the resin particles or used initiator which may be incorporated into polymer chains of the resin particles. It is noted that any other exclusions referenced above with respect to the resin particles and latex may apply to embodiments of the toner compositions.

Toner Properties

In embodiments, the dry toner particles, exclusive of external surface additives, have the following characteristics:

(1) Volume average particle diameter $D_{50}$ of from 2 μm to 20 μm, from 5 μm to 15 μm, or from 5 μm to 10 μm.

(2) Number Average Geometric Size Distribution (GSDn) and/or Volume Average Geometric Size Distribution (GSDv) of from 1.05 to 1.35, from 1.15 to 1.30, or from 1.20 to 1.15.

(3) Circularity of from 0.92 to 0.99, from 0.94 to 0.97, or from 0.95 to 0.96 (as measured with, for example, a Sysmex 3000).

(4) Onset glass transition temperature ($T_g$) of from 48° C. to 85° C., from 50° C. to 90° C., or from 52° C. to 85° C. (as measured with, for example, differential scanning calorimetry).

With respect to volume average particle diameter $D_{50}$, GSDv, and GSDn, these characteristics may be measured using a measuring instrument such as a Nanotrac™ 252, operated in accordance with the manufacturer's instructions.

Both the present latexes and toners may be characterized by their volatile organic content (VOC). In embodiments, the VOC content is less than 500 ppm as measured by Gas Chromotographic system equipped with a flame ionization detector. This includes less than 250 ppm, less than 100 ppm, less than 50 ppm, and from 1 ppm to 50 ppm. The measurement includes the amount of residual monomers and potential by-products of the polymerization and impurities originating from the starting monomers.

The present toners may be characterized by their residual aluminum and sodium levels as measured using Inductively Coupled Plasma (ICP) as described in the Examples, below. The aluminum levels may be less than 300 ppm, less than 275 ppm, or less than 250 ppm. The sodium level may be less than 250 ppm, less than 225 ppm, or less than 200 ppm.

Developers and Carriers

The toners may be formulated into a developer composition. Developer compositions can be prepared by mixing the toners with known carrier particles, including coated carriers, such as steel, ferrites, and the like. Such carriers include those disclosed in U.S. Pat. Nos. 4,937,166 and 4,935,326, the entire disclosures of each of which are incorporated herein by reference. The carriers may be present from about 2% to about 8% by weight of the toner. The carrier particles can also include a core with a polymer coating thereover, such as polymethylmethacrylate (PMMA), having dispersed therein a conductive component like conductive carbon black. Carrier coatings include silicone resins such as methyl silsesquioxanes, fluoropolymers such as polyvinylidiene fluoride, mixtures of resins not in close proximity in the triboelectric series such as polyvinylidiene fluoride and acrylics, thermosetting resins such as acrylics, mixtures thereof and other known components.

The toners may be incorporated into a number of devices ranging from enclosures or vessels, such as, a vial, a bottle, a flexible container, such as a bag or a package, and the like, to devices that serve more than a storage function. The toners may be incorporated into devices dedicated, for example, to delivering the same for a purpose, such as, forming an image. Hence, particularized toner delivery devices may be utilized, see, for example, U.S. Pat. No. 7,822,370. Such devices include cartridges, tanks, reservoirs and the like, and may be replaceable, disposable or reusable. Such a device may comprise a storage portion; a dispensing or delivery portion; and the like; along with various ports or openings to enable toner addition to and removal from the device; an optional portion for monitoring amount of toner in the device; formed or shaped portions to enable sitting and seating of the device in, for example, an imaging device; and the like. A toner of interest may be included in a device dedicated to delivery thereof, for example, for recharging or refilling toner in an imaging device component, such as, a cartridge, in need of toner, see, for example, U.S. Pat. No. 7,817,944, wherein the imaging device component may be replaceable or reusable.

Imaging

The toners may be used for xerographic processes, including those disclosed in U.S. Pat. No. 4,295,990, the disclosure of which is hereby incorporated by reference in entirety. In embodiments, any known type of image development system may be used in an image developing device, including, for example, magnetic brush development, jumping single component development, two component development, hybrid scavengeless development (HSD) and the like. Those and similar development systems are within the purview of those skilled in the art.

Imaging processes include, for example, preparing an image with a xerographic device including a charging component, an imaging component, a photoconductive component, a developing component, a transfer component, and a fusing component. In embodiments, the development component may include a developer prepared by mixing a carrier with a toner composition described herein. The xerographic device may include a high-speed printer, a black and white high-speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 160° C., after or during melting onto the image receiving substrate.

Use of the present latexes/resin particles is not limited to providing toners. By way of illustration, the latex may be used to provide latex paints. In addition to water and any of the disclosed resin particles, a latex paint generally comprises a colorant. Any of the disclosed colorants may be used. Surfactants are also often included, such as any of the surfactants disclosed herein. Other additives which may be included include fillers such as inorganic particles (e.g., silica), dispersants, defoamers, wetting agents, viscosity adjusting additives, waxes, coalescents, etc. These additives may be present at any amount to achieve a desired property for the latex paint. Any exclusions described above with respect to the latexes and toners may also apply to embodiments of the latex paint.

EXAMPLES

The following Examples are being submitted to further define various species of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

Comparative Latex Example 1

A latex comprising resin particles generated from the emulsion polymerization of styrene, n-butyl acrylate and β-CEA was prepared as follows. A surfactant solution containing 6.37 kilograms Dowfax 2A1 (anionic surfactant) and 4096 kg deionized water was prepared by mixing for 10 minutes in a stainless-steel holding tank. The holding tank was then purged with nitrogen for 5 minutes before transferring into the reactor. The reactor was then continuously purged with nitrogen while being stirred at 100 RPM. The reactor was then heated up to 80° C. at a controlled rate, and held there. Separately, 64.5 kg of ammonium persulfate initiator was dissolved in 359 kg of deionized water. Separately, a monomer emulsion was prepared in the following manner: 3516.6 kg of styrene, 787.7 kg of butyl acrylate, 129.1 kg of beta-carboxylethyl acrylate (β-CEA), 30.1 kg of 1-dodecanethiol, 15.06 kg of ADOD (1,10-decanediol diacrylate), 85.1 kg of Dowfax 2A1 (anionic surfactant), and 2048 kg of deionized water were mixed to form an emulsion. One percent of the above emulsion was then slowly fed into the reactor containing the aqueous surfactant phase at 80° C. to form the "seeds" while being purged with nitrogen. The initiator solution was then slowly charged into the reactor and after 10 minutes the rest of the monomer emulsion was continuously fed in a using metering pump at a rate of 0.5%/min. After 100 minutes, half of the monomer emulsion had been added to the reactor. At this time, 36.18 kilograms of 1-dodecanethiol was stirred into the monomer emulsion, and the monomer emulsion was continuously fed in at a rate of 0.5%/min. At this time the reactor stirrer was increased to 350 RPM. Once all the monomer emulsion is charged into the main reactor, the temperature was held at 80° C. for an additional 2 hours to complete the reaction. Full cooling was then applied and the reactor temperature was reduced to 35° C. The product was collected into a holding tank. After drying the latex, the following properties were measured: $M_w=33,700$, $M_n=10,900$, and the onset glass transition temperature ($T_g$) was 58.6° C. The $T_g$ was measured using a TA Instrument Discovery Differential Scanning calorimeter 2500. For this measurement, 5-10 mg of toner sample was placed in an aluminum pan, covered with a lid and crimped shut. A reference pan and lid were also crimped. The sample was placed in the instrument and equilibrated at 0° C. then ramped up to 150° C. at a controlled heating rate, then cooled to 0° C. and then heated again at the same rate to 150° C. The heat flow data as a function of temperature was recorded. The glass transition temperature of the sample was determined where the onset of the step transition is reported for the $2^{nd}$ heat.

To determine polymer molecular weight properties including weight-average molecular weight ($M_w$), number-average molecular weight ($M_n$), and polydispersity (MWD or PDI), a Water Advanced Polymer Chromatography (APC) instrument was used. The instrument is equipped with a series of separation columns and tetrahydrofuran (THF) solvent is used as the mobile phase. Approximately 25 mg of sample is dissolved in THF, filtered and then a portion is injected into the instrument. The FID detector quantities the number and mass of the various polymer chains as they elute through the columns. The instrument is calibrated with a series of polystyrene standards and is used for a relative determination of the molecular weight properties for the sample analyzed.

Comparative Latex Example 2

A latex comprising resin particles generated from the emulsion polymerization of styrene, n-butyl acrylate and β-CEA was prepared as follows. A surfactant solution containing 0.3352 kilograms Calfax (anionic surfactant) and 476.9 kg deionized water was prepared by mixing for 10 minutes in a stainless-steel holding tank. The holding tank was then purged with nitrogen for 5 minutes before transferring into the reactor. The reactor was then continuously purged with nitrogen while being stirred at 100 RPM. The reactor was then heated up to 80° C. at a controlled rate, and held there. Separately, 1.9838 kg of ammonium persulfate initiator was dissolved in 14.96 kg of deionized water. Separately, a monomer emulsion was prepared as follows: 74.5767 kg of styrene, 24.7977 kg of butyl acrylate, 2.9849 kg of β-CEA, 48.11 kg of 1-dodecanethiol, 1.8991 kg of Dowfax 2A1 (anionic surfactant), and 46.9293 kg of deionized water were mixed to form an emulsion. Two percent of the monomer emulsion was then slowly fed into the reactor containing the aqueous surfactant phase at 80° C. to form the "seeds" while being purged with nitrogen. The initiator solution was then slowly charged into the reactor and after 10 minutes the rest of the emulsion was continuously fed in using a metering pump at a rate of 0.5%/min. Once all the monomer emulsion was charged into the main reactor, the temperature was held at 80° C. for an additional 2 hours to complete the reaction. Full cooling was then applied and the reactor temperature was reduced to 35° C. The product was collected into a holding tank. After drying the latex, the following properties were measured: $M_w=55,000\pm3,000$, percent solids content was 41%, and the $T_g$ was 55° C.±3° C.

Comparative Latex Example 3

A latex comprising resin particles generated from the emulsion polymerization of styrene, n-butyl acrylate and β-CEA was prepared as follows. A surfactant solution containing 605 grams of Dowfax 2A1 (anionic surfactant) and 387 kg deionized water was prepared by mixing for 10 minutes in a stainless-steel holding tank. The holding tank was then purged with nitrogen for 5 minutes before transferring into the reactor. The reactor was then continuously purged with nitrogen while being stirred at 100 RPM. The reactor was then heated up to 80° C. at a controlled rate, and held there. Separately, 6.1 kg of ammonium persulfate initiator was dissolved in 30.2 kg of de-ionized water. Separately, a monomer emulsion was prepared as follows: 311.4 kg of styrene, 95.6 kg of butyl acrylate, 12.21 kg of β-CEA, 2.88 kg of 1-dodecanethiol, 1.42 kg of ADOD (1,10-decanediol diacrylate), 8.04 kg of Dowfax 2A1 (anionic surfactant), and 193 kg of deionized water were mixed to form an emulsion. 1% of the monomer emulsion was then slowly fed into the reactor containing the aqueous surfactant phase at 80° C. to form the "seeds" while being purged with nitrogen. The initiator solution was then slowly charged into the main reactor and after 10 minutes the rest of the emulsion was continuously fed into the reactor containing the aqueous surfactant phase using metering pump at a rate of 0.5%/min, the temperature was held at 80° C. for an additional 2 hours to complete the reaction. Full cooling was then applied and the temperature was reduced to 35° C. The product was collected into a holding tank. After drying a portion of the latex, the following properties were measured: $M_w$=35,419, $M_n$=11,354, and the $T_g$ was 51.0° C.

Comparative Latex Example 4

A latex comprising of resin particles generated from the emulsion polymerization of styrene, n-butyl acrylate and β-CEA was prepared as follows. A surfactant solution containing 605 grams of Dowfax 2A1 (anionic surfactant) and 387 kg deionized water was prepared by mixing for 10 minutes in a stainless-steel holding tank. The holding tank was then purged with nitrogen for 5 minutes before transferring into the reactor. The reactor was then continuously purged with nitrogen while being stirred at 100 RPM. The reactor was then heated up to 80° C. at a controlled rate, and held there. Separately, 6.1 kg of ammonium persulfate initiator was dissolved in 30.2 kg of deionized water. Separately, a monomer emulsion was prepared as follows: 332.5 kg of styrene, 74.5 kg of butyl acrylate, 12.21 kg of β-CEA, 2.88 kg of 1-dodecanethiol, 1.42 kg of dodecanediol diarylate (ADOD), 8.04 kg Dowfax 2A1, and 193 kg of deionized water were mixed to form an emulsion. One percent of the emulsion was then slowly fed into main reactor containing the aqueous surfactant phase at 80° C. to form the "seeds" while being purged with nitrogen. The initiator solution was then slowly charged into the reactor and after 10 minutes the rest of the emulsion was continuously fed in using a metering pump at a rate of 0.5%/min. Once all the monomer emulsion was charged into the reactor, the temperature was held at 80° C. for an additional 2 hours to complete the reaction. Full cooling was then applied and the reactor temperature was reduced to 35° C. The product was discharged into a holding tank and dried to yield a latex having the following molecular properties: $M_w$=33,700, $M_n$=10,900 and $T_g$=58.6° C.

Latex Example 1: Synthesis of Styrene-Butyl Acrylate-Glycerol Formal Methacrylate Latex In a 2 L buchi reactor, equipped with two P4 type impellers, 0.57 g of Dowfax 2A1 (at 47% solids) was added to 518 g deionized water (DIW). The reactor was deoxygenated by passing a stream of nitrogen through it during the reaction. The reactor was ramped to 77° C. and the RPM was set to 350. Separately, in a 1 L glass vessel, equipped with two P4 impellers, a monomer emulsion was prepared by mixing (at 400 rpm) 86.1 g glycerol formal methacrylate, 344 g Styrene, 143.5 g n-butyl acrylate, 17.2 g b-CEA, 2.7 g n-dodecyl mercaptan (NDM, previously called DDT), 9.81 g Dowfax 2A1 surfactant (at 47% solids) and 265 g DIW together. 17.4 g of seed was taken from the monomer emulsion and pumped into the 2 L reactor at 77° C. An initiator solution prepared from 8.61 g of ammonium persulfate in 24.3 g of DIW was added over 20 minutes after the seed emulsion addition. The remaining monomer emulsion was fed into the reactor over 120 min. Once half the monomer emulsion was added the RPM in the reactor was increased to 400 rpm. At the end of the monomer feed, the latex was held for an additional 2 hours then cooled. The resultant latex containing 43% percent solids with a $D_{50}$ particle size of 217 nm was obtained. The $T_g$ of the dried latex (resin particles) was 56.2° C. Residual n-butyl acrylate monomer was 54.81 ppm; residual styrene monomer was 37.1 ppm and residual glycerol formal methacrylate was 20.87 ppm. The weight average molecular weight $M_w$ was 52,574 and the number average molecular weight $M_n$ was 26,171.

Comparative Toner Example 1

286.9 grams of Comparative Latex Example 3 having a solids loading of 41.4 weight % and 60.49 grams of a wax emulsion comprising a purified paraffin wax containing C42 (FNP-0092® available from Nippon Seiro) having a solids loading of 30.50 weight % were added to 613.5 grams of deionized water in a vessel and stirred using an IKA Ultra Turrax® T50 homogenizer operating at 4,000 rpm. Thereafter, 64.1 grams of a cyan pigment dispersion PB15:3 available from Sun Chemical as Sun Pigment W51924 having a solids loading of 17 weight % was added to the reactor, followed by dropwise addition of 36 grams of a flocculent mixture containing 3.6 grams of polyaluminum chloride mixture and 32.4 grams of a 0.02 molar nitric acid solution. As the flocculent mixture was added dropwise, the homogenizer speed was increased to 5,200 rpm and the reactor contents were homogenized for an additional 5 minutes. Thereafter, the mixture was heated to a temperature of 52° C. at a rate of 1.0° C. per minute and held at 52° C. for a period of about 1.5 to about 2 hours resulting in a cyan toner particle having a volume average particle size of 5 microns as measured with a Coulter Counter. During the heating period, the stirrer was run at about 250 rpm. Ten minutes after the set temperature of 49° C. was reached, the stirrer speed was reduced to about 220 rpm.

Following this step, 134.6 grams of Comparative Latex Example 4 having a solids loading of 41.6 weight % was added to the reactor mixture and allowed to aggregate for an additional period of about 30 minutes at 51° C. to yield a cyan toner particle having a volume average particle diameter of about 5.7 microns as measured with a Coulter Counter. The pH of the reactor mixture was adjusted to pH 4.0 by using a 1.0 M sodium hydroxide solution added to 4.82 grams of ethylene diamine tetra-acetic acid (EDTA) Versene™ 100 available from Dow having a solids loading of 39 weight %. Thereafter the reactor mixture was heated at a rate of 1.0° C. per minute to a temperature of 95° C. Following this, the reactor mixture was gently stirred at 95° C. for 3 hours to enable the particles to coalesce and spherodize. After 1 hour of coalescence, the pH of the reactor was adjusted to pH 7.0 and the reactor mixture was gently stirred for the remaining 2 hours. The reactor heater was then turned off and the reaction mixture was allowed to cool to room temperature at a rate of 1.0° C. per minute. The resulting toner composition was composed of about 16.7 percent toner particles, 0.25 percent anionic surfactant, and about 82.9 percent water (all by weight based on the total weight of the toner composition). The toner particles were composed of 58 weight percent styrene/acrylate polymer resin (from Comparative Latex Example 3), about 28 weight percent styrene/acrylate polymer resin (from Comparative Latex Example 4), about 5 weight percent PB15:3 pigment and about 9 weight percent FNP-0092TM wax and had a volume average particle diameter of about 5.7 microns and a geometric size distribution (GSD) of about 1.19. The toner particles were washed 6 times, wherein the first wash was conducted at a pH of 10 at 63° C., followed by 3 washes with deionized water at room temperature, one wash carried out at a pH of 4.0 at 40° C., and finally the last wash with deionized water at room temperature. The final measured aluminum concentration in the dried toner particle was 265 ppm as measured by Inductively Coupled Plasma Emission Spectroscopy (ICP).

Toner Example 1

278 grams of the Latex of Example 1 having a solids loading of 42.6 weight %, 75 grams of a wax emulsion comprising a Fischer Tropsch wax (Q436B® available from Cytech) having a solids loading of 30 weight %, and 43 g of cyan pigment dispersion (PB15:3 available from Sun Chemical) having a solids loading of 25.6 weight % were added to 630 grams of deionized water in a vessel and homogenized using an IKA Ultra Turrax® T50 homogenizer operating at 4,000 rpm. During homogenization, 36 grams of a flocculent mixture containing 3.6 grams of polyaluminum chloride mixture and 32.4 grams of a 0.02 molar nitric acid solution were added dropwise. Thereafter, the mixture was heated to a temperature of 52° C. at a rate of 1.0° C. per minute and held for a period of about 1.5 to about 2 hours resulting in a cyan toner particle having a volume average particle size of 5 microns as measured with a Coulter Counter. During the heating period, the stirrer was 225 rpm until 35° C. was reached, the stirrer speed was reduced to about 200 rpm.

Following this step, 131.6 grams of the Latex of Example 1 was added to the reactor mixture and allowed to aggregate for an additional period of about 60 minutes at 56° C. to yield a cyan toner particle having a volume average particle diameter of about 5.9 microns as measured with a Coulter Counter. The pH of the reactor mixture was adjusted to pH 4.0 by using a 1.0 M sodium hydroxide solution followed by 4.82 grams of ethylene diamine tetra-acetic acid (EDTA) Versene™ 100 available from Dow having a solids loading of 39 weight %. Thereafter the reactor mixture was heated at a rate of 1.0° C. per minute to a temperature of 95° C. Following this, the reactor mixture was gently stirred at 95° C. for 3 hours to enable the particles to coalesce and spherodize. The reactor heater was then turned off and the reaction mixture was cooled to 63° C. to room temperature at a rate of 1.0° C. per minute. The resulting toner composition was composed of about 16.7 percent toner particles, 0.25 percent anionic surfactant, and about 82.8 percent water (all by weight based on the total weight of the toner composition. The toner particles were composed of about 84 weight percent styrene/acrylate polymer resin (from the Latex of Example 1), about 5 weight percent PB15:3 pigment, and about 11 weight percent Q436B wax and had a volume average particle diameter of about 5.9 microns and a geometric size distribution (GSD) of about 1.23. The particles were washed 4 times, wherein the first wash was conducted at a pH of 9 at 63° C., followed by one wash with deionized water at room temperature, one wash carried out at a pH of 4.0 at room temperature, and finally the last wash with deionized water at room temperature. The final measured aluminum content was 239.89 ppm and sodium content was 192.96 ppm in the dried toner particles as measured by Inductively Coupled Plasma Emission Spectroscopy (ICP). The $T_g$ for the toner particles was 82.32° C. and the onset of decomposition was 355.8° C. as measured by Thermal Gravimetric Analysis using a TA Instruments Q5000IR TGA system operated with argon gas.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

If not already included, all numeric values of parameters in the present disclosure are proceeded by the term "about" which means approximately. This encompasses those variations inherent to the measurement of the relevant parameter as understood by those of ordinary skill in the art. This also encompasses the exact value of the disclosed numeric value and values that round to the disclosed numeric value.

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A paint consisting of water, a colorant, and resin particles comprising a polymerization product of reactants comprising a dioxane/dioxolane monomer and a vinyl co-monomer, wherein the dioxane/dioxolane monomer is an ester of (meth)acrylic acid with an alcohol comprising a dioxane moiety, an ester of (meth)acrylic acid with an alcohol comprising a dioxolane moiety, or both, wherein the resin particles have a $D_{50}$ particle size in a range of from about 100 nm to about 400 nm, wherein the resin particles consist of the polymerization product of the reactants and the reactants consist of glycerol formal (meth)acrylate, styrene, butyl (meth)acrylate, beta-carboxyethyl acrylate, an initiator, and optionally, a crosslinking agent.

2. The paint of claim 1, wherein the dioxane/dioxolane monomer is present in the resin particles at an amount in a range of from about 1 weight % to about 50 weight %.

3. The paint of claim 1, wherein the butyl (meth)acrylate is present in the resin particles at an amount of at least about 15 weight %.

4. The paint of claim 1, wherein the resin particles have an onset glass transition temperature $T_g$ in a range of from about 40° C. to about 85° C.

\* \* \* \* \*